Dec. 9, 1941.  F. M. LAMBERT  2,265,735
LADDER TREAD
Filed Aug. 28, 1941
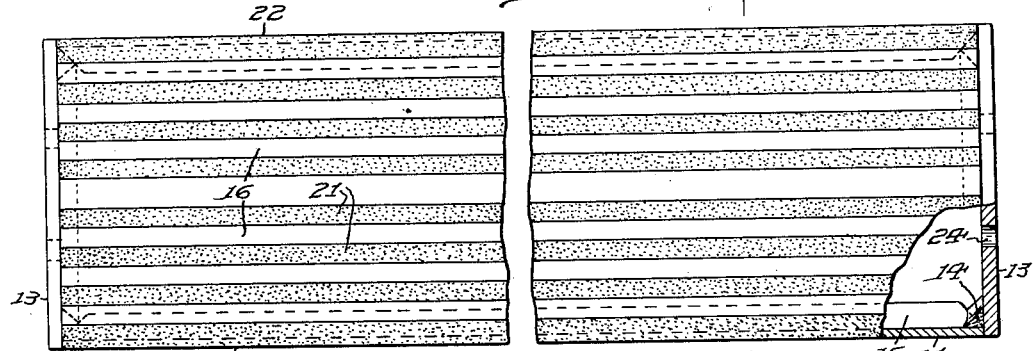
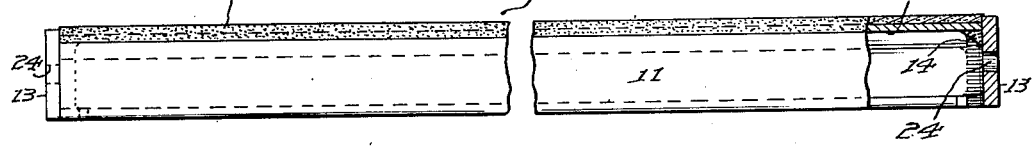
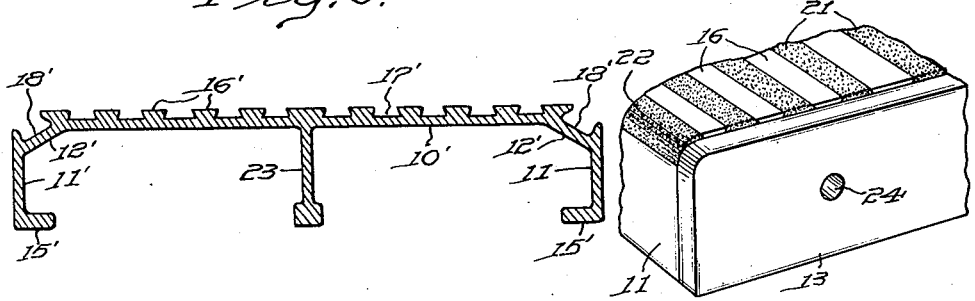
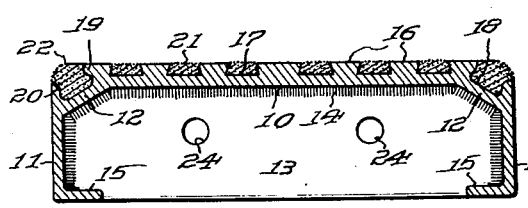
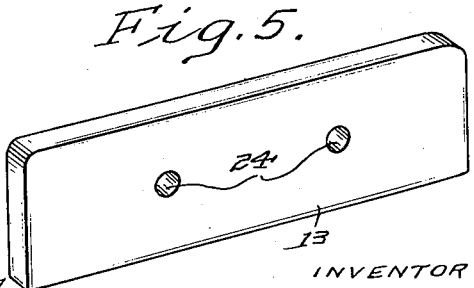
INVENTOR
Francis M. Lambert.
BY John W. Myers
ATTORNEY
WITNESS
F. J. Hartman.

Patented Dec. 9, 1941

2,265,735

UNITED STATES PATENT OFFICE 2,265,735

LADDER TREAD

Francis M. Lambert, Narberth, Pa., assignor to Heintz Manufacturing Company, a corporation of Pennsylvania Application August 28, 1941, Serial No. 408,576

6 Claims. (Cl. 228—58)

The invention relates to a ladder tread and involves an improvement in the type of tread in which the wear surface is formed of projecting ribs and intervening grooves filled with a wear-resistant or anti-slipping material, such as bonded particles of abrasive.

In ladder treads of this general character it has been found advantageous where the tread is intended for certain uses to provide a nosing of wear-resisting or anti-slipping material along the meeting edge of the top plate and one or both of the side plates which form the box-like tread structure. In accordance with the usual methods of manufacture, the provision of a groove of dovetail or other formation along the longitudinal corners of the tread necessitates the use of a top plate and side plates of greater thickness than would be required if such a groove were not used. One of the principal objects of the present invention is the provision of a tread structure having a groove for anti-slipping material at its longitudinal edges or corners without utilizing top and side plates of excessive thickness. Another object of the improvement is the provision of a structure in which the anti-slipping material in the corner grooves is amply protected by projecting edges of the top and side plates. A further object is a tread structure in which the end plates serve to tie the top plate and the side plates together, and also to close the ends of the grooves in the top plate. Still further objects and advantages of the improvement will be apparent from the following description, taken with the accompanying drawing, wherein:

Fig. 1 is a top plan view of one form of a ladder tread made in accordance with the present invention, a part of the tread being cut away and one corner being shown in section to illustrate details of construction;

Fig. 2 is a side elevational view of the tread shown in Fig. 1, partly cut away and partly in section to show details of construction;

Fig. 3 is a transverse sectional view taken on the line 3—3 of Fig. 1;

Fig. 4 is an isometric view of a corner of the tread, showing the manner in which the end plate serves to close the ends of the grooves in the top plate;

Fig. 5 is an isometric view of one of the end plates, and

Fig. 6 is a transverse sectional view showing a modified form of tread plate.

In the main the tread in which the present improvements are incorporated is in the form of a box-like structure open at the bottom and comprising a top plate 10, side plates 11 extending downwardly at the longitudinal edges of the top plate 10, an angularly arranged connecting plate 12 joining each of the side edges of the top plate 10 and the upper edge of the adjacent side plate 11, and end plates 13 welded as shown at 14, or otherwise secured to the ends of the top plate 10, the side plates 11 and the connecting plates 12. If desired, the lower edges of the side plates 11 may be provided with an inturned flange 15 for the purpose of giving the structure additional rigidity.

The upper surface of the top plate 10 is provided with a plurality of longitudinally extending ribs 16 of such a shape and cross section as to provide intervening grooves 17, preferably of dovetail formation. A longitudinal groove 18 is likewise provided on the outer surface of each of the connecting plates 12. The inner wall of the groove 18 is formed by an overhanging extension 19 of the top plate or the outermost rib thereon, and the outer wall of groove 18 is formed by an extension 20 projecting upwardly from the upper edge of the adjacent side plate 11. Such a construction for the corner grooves 18 provides a dovetail formation, and the upwardly projecting edge 20 serves to protect the filling of the grooves 18 against the damaging effect of any unusual impacts upon the sides or longitudinal corners of the tread.

The body of the tread described above may be built up in any suitable manner, although it is preferable to form the top plate 10, the side plates 11 and the connecting plates 12 by an extruding operation whereby the ribs 16 and the grooves 17, 18, are simultaneously formed thereon. When made in this manner it is preferable to utilize an aluminum alloy for the body of the tread, including the end plates 13, the latter being welded thereon after the extruded body is cut to suitable lengths. When the end plates 13 are secured in place their upper edges serve to close the ends of grooves 17 and 18 and retain the filling material when it is placed therein.

The grooves 17 and 18 are filled with a wear-resistant or anti-slipping composition preferably comprising a mixture of small particles of abrasive material, such as aluminum oxide, and a synthetic resin. The composition is placed in the grooves 17, 18 in any suitable manner, the exposed surface of the material 21 in grooves 17 being substantially level with the upper surfaces of ribs 16. The exposed surface of the material 22 in grooves 18 is given such cross-sectional shape as may be desired, its contour preferably being such as to provide a substantially continuous surface from the exposed surface of the outermost rib 16, over the filling material 22, and meeting with the outer vertical surface of side plate 11. After the composition has been placed in the grooves the treads may be subjected to such baking or curing operation as may be required by the particular resinuous binding agent employed.

In some cases, particularly when the top plate is of such a width as to make it desirable, other reinforcing means may be provided for the top plate in addition to the side plates or ribs 11. In the modified form of tread plate shown in Fig. 6, the top plate 10' is provided on its upper surface with longitudinal ribs 16' and grooves 17' similar to the ribs 16 and grooves 17 of the form described above. The modified form also has side plates or ribs 11', connecting plates 12', reinforcing flanges 15', and grooves 18', all similar to the corresponding parts as shown in Fig. 3. As an added reinforcement, the modified form is provided with a central stiffening rib 23 which extends longitudinally on the under surface of the top plate 10'. As in the case of the form shown in Fig. 3, the modified form of tread plate shown in Fig. 6 is preferably made by an extruding operation whereby the grooved top plate, the grooved connecting plates, and the central and side stiffening plates are simultaneously formed. The extruded body is then cut to suitable lengths, end plates are secured thereon, and the treads finished in the manner heretofore described.

From the above description, taken with the accompanying drawing, it will be apparent that the structure which is provided for the body of the tread makes possible the use of wear-resistant material at the meeting edges of the top plate and the side plates without necessitating the use of unduly thick plates for supporting the filling 22 in the corner grooves 18. The improvement also provides a simple and economical structure for permitting the use of the wear-resistant material 22 at a position where the greatest wear on the tread usually occurs. At the same time the wear-resistant material in grooves 18 is amply protected by the upstanding edge 20 on the side plates and by the overhanging edge 19 on the top plate. The tread is particularly designed for use with ship ladders, and the end plates may be provided with suitable holes 24 to receive bolts for securing the tread between the side members of a ladder in a manner well understood.

While certain preferred structural forms of the invention have been disclosed herein, it is understood that the invention is not intended to be limited to the precise structure disclosed. The above description and the accompanying drawing are therefore to be regarded as illustrative only, and it is to be understood that the invention is susceptible of other forms and arrangements so long as they come within the scope of the appended claims.

What I desire to claim is:

1. A ladder tread comprising a top plate having dovetail grooves extending longitudinally of the upper surface thereof, a connecting plate extending downwardly at an angle to each of the longitudinal edges of said top plate and having a dovetail groove extending longitudinally on the outer face thereof, a side plate extending downwardly from the lower edge of each of said connecting plates, end plates secured to the ends of said top plate, said connecting plates and said side plates, and bonded particles of wear-resistant material filling said grooves.

2. A ladder tread comprising a top plate having dovetail grooves and intervening ribs extending longitudinally on the upper surface thereof, a connecting plate extending downwardly at an angle on each of the longitudinal edges of said top plate and having a dovetail groove extending longtudinally on the outer surface thereof, a side plate extending downwardly from the lower edge of each of said connecting plates, the upper edges of said side plates extending above the lower edges of said connecting plates to form the outer walls of the dovetail grooves in said connecting plates, end plates secured to the ends of said top plate, said connecting plates, and said side plates, and bonded particles of abrasive material filling said grooves.

3. A ladder tread comprising a top plate having dovetail grooves and intervening ribs extending longitudinally on its upper surface, a connecting plate extending downwardly at an angle on each of the longitudinal edges of said top plate, a side plate extending downwardly from the lower edge of each of said connecting plates and having its upper edge projecting above said lower edge to form the outer wall of a dovetail groove on said connecting plate, end plates secured to the ends of said top plate, said connecting plates and said side plates, and having their upper edges positioned to close the ends of said grooves, and bonded particles of wear-resistant material filling said grooves.

4. In a ladder tread having a top plate and a side plate, the combination therewith of a connecting plate arranged at an angle to said plates and joining the adjacent edges thereof, a projection on the edge of said top plate and overhanging said connecting plate to form one wall of a dovetail groove, a projection on the edge of said side plate and extending above the lower edge of said connecting plate to form the other wall of said dovetail groove, and a mixture of particles of abrasive material and a bonding agent filling said groove.

5. A ladder tread comprising a top plate having dovetail grooves and intervening ribs extending longitudinally on the upper surface thereof, side plates connected to said top plate, end plates secured to the ends of said top plate and said side plates, the upper edges of said end plates being positioned to close the ends of said grooves, and bonded particles of abrasive material filling said grooves.

6. A ladder tread comprising a top plate having longitudinal grooves in the upper surface thereof, longitudinal stiffening ribs secured on the under side of said top plate, end plates secured on the ends of said top plate and said stiffening ribs and closing the ends of said grooves, and bonded particles of abrasive material filling said grooves.

FRANCIS M. LAMBERT.